(12) United States Patent
Abelleira et al.

(10) Patent No.: US 6,172,147 B1
(45) Date of Patent: Jan. 9, 2001

(54) ADDITIVE FOR PRODUCTION OF HIGHLY WORKABLE MORTAR CEMENT

(75) Inventors: Angel Abelleira, Nashua, NH (US); John Hallock, Columbia, MD (US)

(73) Assignee: W. R. Grace & Co.-Conn., New York, NY (US)

( * ) Notice: Under 35 U.S.C. 154(b), the term of this patent shall be extended for 0 days.

(21) Appl. No.: 09/233,806

(22) Filed: May 5, 1998

Related U.S. Application Data

(62) Division of application No. 08/822,165, filed on Mar. 21, 1997, now Pat. No. 5,782,972.

(51) Int. Cl.[7] .......................... C04B 24/00; C04B 24/26; C04B 38/00
(52) U.S. Cl. ...................... 524/95; 524/3; 524/4; 524/156; 524/157; 524/158; 524/230; 524/293; 524/313; 524/320; 524/366; 524/369; 524/372; 524/376
(58) Field of Search ............................. 524/95, 156, 157, 524/158, 230, 243, 313, 320, 366, 369, 370, 376

(56) References Cited

U.S. PATENT DOCUMENTS

| | | | |
|---|---|---|---|
| 5,266,646 | * 11/1993 | Eisenhart et al. | 525/301 |
| 5,451,641 | * 9/1995 | Eisenhart et al. | 525/301 |

* cited by examiner

*Primary Examiner*—Peter A. Szekely
(74) *Attorney, Agent, or Firm*—Craig K. Leon; William L. Baker

(57) ABSTRACT

Mortar cement additives provide workability while retaining strength by employing a multi-stage polymer comprising a hydrophobically-modified, ionically-soluble polymer stage, the polymer being soluble at a pH of 6 and above; and an air-entraining agent. The additives also employ, as optional ingredients, set retarding agents and superplasticizers. Examplary methods of the invention involve addition of the multi-stage polymer and an air entraining agent to the mortar cement, preferably during intergrinding of Portland cement in the mill. Cement compositions comprising the polymer and an air-entraining agent are also disclosed.

27 Claims, No Drawings

ADDITIVE FOR PRODUCTION OF HIGHLY WORKABLE MORTAR CEMENT

This is a divisional of application Ser. No. 08/822,165, filed Mar. 21, 1997, now U.S. Pat. No. 5,782,972

FIELD OF THE INVENTION

The present invention relates to additives for hydraulic cement compositions. More particularly, this invention concerns additives for hydraulic cement which are particularly useful in Portland cement compositions such as masonry cements used for bonding bricks, blocks, and other masonry units.

BACKGROUND OF THE INVENTION

Portland masonry cements are compositions produced particularly for use by masons in the bonding of bricks, blocks, and other masonry units. Such cements are typically mixed prior to use with a fine aggregate, usually sand, and water. It is desirable that the wet mortar have a high degree of plasticity for working (e.g., trowelling) by the mason, as well as other desirable properties such as good "board life" (i.e., a long working time).

Masonry cements are produced by intergrinding Portland cement (containing gypsum for proper setting time regulation), with, generally, from about 20 to 65%, based on the total weight, of a solid material such as limestone, chalk, talc, pozzolans, clay, gypsum, or combinations of such. Limestone is most often the ingredient interground with the Portland cement because of its good plasticity enhancing properties. Such masonry cements are ground to a greater degree of fineness than most Portland cements intended for use in structural concretes. The finer grind of masonry cements improves the plasticity of the finished mortar products.

As discussed in U.S. Pat. No. 5,294,256, additive products are sold for mixture with the masonry cement to add certain desirable properties to the masonry cement composition. It is common practice to mix such additive products with the cement during the intergrinding of the cement with the gypsum, limestone, etc.

In U.S. Pat. Nos. 3,865,601 and 3,885,985, additive products of the above type are described. The additives described therein comprise an aqueous oil-in-water emulsion containing water, a water-insoluble, water-repelling acid component (e.g., tall oil), an emulsifier (e.g., a salt of such an acid), and a setting time retarding agent (e.g., sucrose). This additive product is advantageously dispersible in water which reduces the risk of it being overdosed. The additive may also contain an air-entraining agent as an additional optional component.

An improved emulsion additive product is described in U.S. Pat. No. 4,375,987. In addition to the above constituents, this additive comprised an emulsion stabilizer such as glycol which prevents an oil-in-water emulsion from destabilizing when exposed to freezing temperatures during shipping or storage prior to use.

As explained in U.S. Pat. No. 5,294,256, it has been necessary to add further water retention agents, such as cellulose ether, during the grinding process, to improve the plasticity of Portland masonry cements. Conventional water retention agents cause the emulsion additives described above to destabilize and hence must be added as a separate feed stream, often as a dry powder. This method is inconvenient, may increase manufacturing costs, and increases the risk of overdosing the batch with the water retention agent. These conventional water retention agents also may entrain large quantities of air, which may be undesirable where high strength is concerned. Thus, U.S. Pat. No. 5,294,256 taught the use of an improved additive comprising an oil-in-water emulsion having a solids portion comprised of a major proportion of a water-insoluble, water-repelling acid component selected from the group consisting of fatty acids, rosin acids, and mixtures thereof, a set retarding component for the hydraulic cement, and a polymer selected from polyvinyl acetate, polyvinyl alcohol, hydroxypropyl substituted polysaccharides, or mixtures thereof.

Despite the availability of various mortar cement admixtures, the present inventors believe that a novel additive is needed for obtaining a mortar cement that has a satisfactory workability from the subjective viewpoint of the mason who is applying the mortar between the bricks or other masonry units, while providing for a relatively low air content (when compared to masonry cements) to maintain mortar strength. In particular, it is desired to discover a mortar cement additive which can obtain a maximum air content of 14% or less, as required in Type S and Type M mortar cements, as summarized in the table below:

|  | Type N | Type S | Type M |
|---|---|---|---|
| Masonry cement | 21 | 19 | 19 |
| Mortar cement | 16 | 14 | 14 |

Cement manufacturers need to be especially careful when targeting the 14% maximum air content mark, and typically seek a maximum air content of about 12% as safety measure to avoid exceeding the 14% threshold whereby a weakened masonry structure is obtained Accordingly, the need for a novel mortar cement additive is heightened somewhat in view of the need for obtaining a desired strength as provided by a relatively low air content while retaining workability in the mortar.

SUMMARY OF THE INVENTION

In surmounting disadvantages of prior art masonry mortar additives, the present inventors have discovered a novel mortar additive composition that provides the desired strength while providing a workable rheology through controlling the maximum air content such that it does not exceed 14% in the mortar cement. Surprisingly, the present invention achieves this goal by combining a polymer that has heretofore been seen as entraining a superfluity of air, and, secondly, an air entraining agent.

An exemplary masonry additive of the present invention thus comprises: (1) water (20–80% wt.); (2) a multi-stage polymer comprising a hydrophobically-modified, ionically-soluble polymer stage (6–30% based on total weight additive), the polymer being soluble at a pH of 6 and above; and (3) an air-entraining agent (0.1–5.0% based on total weight of additive). An exemplary method of the present invention for modifying a mortar cement comprises adding the foregoing components, preferably premixed together as one liquid, into the mortar cement. More preferably, the components are introduced into the intergrinding of the mortar cement production process at the mill. Exemplary masonry mortar compositions of the invention accordingly comprise a hydratable cementitious binder, an entrained air content of 14% or less, and the multi-stage polymer having a hydrophobically-modified, ionically-soluble polymer stage and an air-entraining agent, as above-mentioned and as will be further described hereinafter.

DETAILED DESCRIPTION OF EXEMPLARY EMBODIMENTS

The masonry mortar additives of the present invention comprise water; a multi-stage polymer comprising a hydrophobically-modified, ionically-soluble polymer stage, the polymer being soluble at a pH of 6 and above; and an entraining agent.

An exemplary multi-stage polymer suitable for use in the present invention comprises two or more polymer stages wherein:

(A) at least one of said polymer stages is an ionically-soluble polymer, the ionically-soluble polymer being polymerized from a monomer mixture comprising:
  (a) about 0.1 to about 55% by weight hydrophobic monomer having the formula

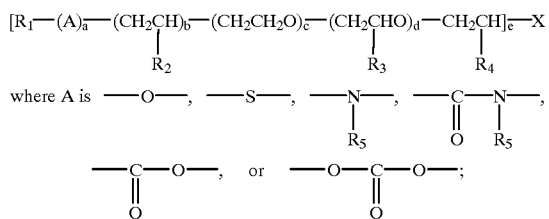

$R_1$ and $R_5$ independently are ($C_1$–$C_{30}$) alkyl, a (mono, di-, or tri-) ($C_1$–$C_{30}$) alkyl-substituted phenyl ring, or a sorbitan fatty ester; $R_2$, $R_3$ and $R_4$ independently are —H or ($C_1$–$C_{10}$) aklyl, aryl or alkylaryl; a is 0 or 1; b is 0 to 50; c is 0 to 150; d is 0 to 50; e is equal to or greater than 1 and X is a group containing at least one ethylenic double bond;
  (b) about 10 to about 69% by weight ($C_3$–$C_{30}$) ehtylenically-unsaturated, ionizable monomer, and
  (c) about 0.1 to about 90% by weight nonionic ($C_2$–$C_{30}$) ethylenically-unsaturated monomer, and
  (d) 0 to about 10% by weight multi-functional compounds;

(B) the ionically-soluble polymer is physically or chemically attached to the polymer particle such that, upon neutralizing the ionically-soluble polymer with base or acid, at least a portion of said ionically-soluble polymer remains attached to the remainder of the polymer particle; and (C) the ionically-soluble polymer comprises from about 1% to about 99% by weight of the polymer particle. A multi-stage polymer, which comprises at least one hydrophobically-modified, ionically-soluble polymer stage is disclosed in U.S. Pat. No. 5,451,641 assigned to Rohm and Haas Company, Philadelphia, Pa. A suitable polymer is commercially available from Rohm and Haas under the tradename ACRYSOL® TT-165. The multi-stage polymer is an alkali-soluble acrylic polymer emulsion, which is typically used for textile formulations, such as for paper, textiles, and nonwovens, although it is also sold for pigmented caulks.

Exemplary air-entraining agents (AEAs) suitable for use in the present invention comprise nonionic AEAs such as fatty alkanolarnides, ethoxylated fatty amines, ethoxylated fatty acids, ethoxylated triglycerides, ethoxylated alkylphenols, ethoxylated alcohols, alkyl ethoxylates, alkylaryl ethoxylates; cationic AEAs such as amine ethoxylates and amine oxides; amphoteric AEAs such as betaines; and anionic AEAs such as fatty alkyl ether sulfates, fatty alkylaryl ether sulfates, alkyl benzene sulfonates, sulfosuccinates, and fatty sulfonates. AEAs useful in the present invention must be soluble at a pH range of 3–6 to obtain solubility in the cementitious mixture, and must also be soluble at a pH of 10–11 and above in view of the hydration process taking place in the mortar. Thus, the AEA must have a fairly wide solubility range.

A preferred air-entraining agent is available from Rhone Poulenc under the tradename Cyclomide DC 212/S.

An exemplary method of the present invention comprises adding to a mortar cement, preferably during the intergrinding of the cement at the mill, the multi-stage polymer in an amount of 0.005–0.10% by weight based on the weight of the cement, and more preferably about 0.015–0.10% by weight cement, and the air entraining agent preferably in an amount of 0.001–0.02% based on the weight of the cement. Preferably, the addition is achieved using a one-time introduction of the multi-stage polymer and air entraining agent which are pre-mixed together as an emulsion. The emulsion can comprise 20–80% water.

Further exemplary mortar additives of the invention optionally comprise, in addition to the multi-stage polymer and air entraining agent, a set retarder (0–35% by total weight) and a superplasticizer. Water-soluble set retarding agents for Portland cement are well known and are preferred for use in the present invention. If the additive is provided in the form of an emulsion, then the set-retarding component of the additive should not be such that it destabilizes the emulsion or causes the additive to be overly viscous.

Water-soluble set-retarding agents useful in the present invention include carbohydrates such as monosaccharides, for example, glucose and fructose; disaccharides, for example, raffinose; polysaccharides, for example, starch and cellulose as well as derivaties thereof, such as pregelatinized starch, dextrin, corn syrup and carboxymethylcellulose; polyhydroxy polycarboxylic compounds, such as tartaric acid and mucic acid; lignosulfonic acid and salts thereof such as calcium, magnesium, ammonium and sodium lignosulfonate; water-soluble salts of boric acid, such as the alkali metal salts thereof; zinc oxide, and water-soluble silicone compounds; as well as mixtures thereof. A preferred retarder is sucrose. The retarders can be used in an amount of about 10–40% wt. in the solution.

An exemplary superplasticizer which may optionally be used in the masonry additives and methods of the invention are EO/PO type comb polymers (e.g., a polyacrylic acid having pendant polyethylene oxide and polypropylene oxide pendant groups) which are known. A suitable EO/PO type superplasticizer is available from W. R. Grace & Co.-Conn. under the tradename ADVA. It is believed that the superplasticizer may be employed in the masonry mortar additives of the present invention in an amount of 0–30% wt. in the solution.

Preferably, the foregoing identified multi-stage polymer and air entraining agent, along with the optional set retarder and/or superplasticizer, are pre-mixed together in a single emulsion so as to minimize overdosing, and introduced into the mortar cement, preferably during or before the intergrinding of the Portland cement in the mill. Alternatively, the components and optional components may be introduced into a mortar cement after the grinding process.

The foregoing description and examples are set forth for illustrative purposes only, and not intended to limit the scope of the invention.

We claim:

1. A mortar cement additive comprising: 6–30% by total weight of the mortar cement additive of a multi-stage polymer comprising a hydrophobically-modified, ionically-soluble polymer stage, the polymer being soluble at a pH of 6 and above; said multi-stage polymer comprising at least two polymer stages wherein:
   (A) at least one of said polymer stages is an ionically-soluble polymer, the ionically-soluble polymer being polymerized from a monomer mixture comprising:
      (a) about 0.1 to about 55% by weight hydrophobic monomer having the formula

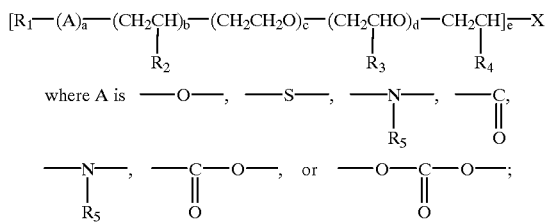

$R_1$ and $R_5$ independently are ($C_1$–$C_{30}$) alkyl, a (mono, di-, or tri-) ($C_1$–$C_{30}$) alkyl-substituted phenyl ring, or a sorbitan fatty ester; $R_2$, $R_3$ and $R_4$ independently are —H or ($C_1$–$C_{10}$) aklyl, aryl or alkylaryl; a is 0 or 1; b is 0 to 50; c is 0 to 150; d is 0 to 50; e is equal to or greater than 1 and X is a group containing at least one ethylenic double bond;
      (b) about 10 to about 69% by weight ($C_3$–$C_{30}$) ethylenically-unsaturated, ionizable monomer, and
      (c) about 0.1 to about 90% by weight nonionic ($C_2$–$C_{30}$) ethylenically-unsaturated monomer, and
      (d) 0 to about 10% by weight multi-functional compounds;
   (B) the ionically-soluble polymer is physically or chemically attached to the polymer particle such that, upon neutralizing the ionically-soluble polymer with base or acid, at least a portion of said ionically-soluble polymer remains attached to the remainder of the polymer particle; and
   (C) the ionically-soluble polymer comprises from about 1% to about 99% by weight of the polymer particle; and
said mortar cement additive further comprising, in the amount of 0.5 to 5.0% by total weight additive, an air entraining agent selected from the group consisting of fatty alkanolamides, ethoxylated fatty amines, ethoxylated fatty acids, ethoxylated triglycerides, ethoxylated alkylphenols, ethoxylated alcohols, alkyl ethoxylates, alkylaryl ethoxylates, amine ethoxylates, amine oxides, betaines, fatty alkyl ether sulfates, fatty alkylaryl ether sulfates, alkyl benzene sulfonates, sulfosuccinates, and fatty sulfonates.

2. The additive of claim 1 wherein said air entraining agent comprises ethylene oxide groups.

3. The additive of claim 1 further comprising a set retarder.

4. The additive of claim 1 further comprising a superplasticizer comprising an EO/PO comb polymer.

5. The additive of claim 1 wherein said multi-stage polymer comprises an alkali-soluble acrylic polymer emulsion.

6. The additive of claim 2 wherein said additive further comprises a superplasticizer comprising an EO/PO comb polymer.

7. The additive of claim 1 wherein said air entraining agent is soluble at a pH of 3–6 and 10–11.

8. The additive of claim 3 wherein said set retarder is selected from the group consisting of monosaccharides, disaccharides, polysacchardies, polyhydroxy polycarboxylic compounds, lignosulfonic acid and salts thereof; water-soluble salts of boric acid, and zinc oxide.

9. The additive of claim 3 wherein said set retarder is sucrose.

10. The additive of claim 6 wherein said EO/PO comb polymer is a polyacrylic acid having pendant polyethylene oxide and polypropylene oxide pendant groups.

11. The additive of claim 1 in the form of an emulsion.

12. The additive of claim 11 comprising water in the amount of 20–80% by weight.

13. The additive of claim 1 wherein said air entraining agent is a fatty alkanolamide.

14. The additive of claim 1 wherein said air entraining agent is an ethoxylated fatty amine.

15. The additive of claim 1 wherein said air entraining agent is an ethoxylated fatty acid.

16. The additive of claim 1 wherein said air entraining agent is an ethoxylated triglyceride.

17. The additive of claim 1 wherein said air entraining agent is an ethoxylated alkylphenol.

18. The additive of claim 1 wherein said air entraining agent is an ethoxylated alcohol.

19. The additive of claim 1 wherein said air entraining agent is an alkyl ethoxylate.

20. The additive of claim 1 wherein said air entraining agent is an alkylaryl ethoxylate.

21. The additive of claim 1 wherein said air entraining agent is an amine ethoxylate.

22. The additive of claim 1 wherein said air entraining agent is an amine oxide.

23. The additive of claim 1 wherein said air entraining agent is a betaine.

24. The additive of claim 1 wherein said air entraining agent is a fatty alkyl or alkylaryl ether sulfate.

25. The additive of claim 1 wherein said air entraining agent is an alkyl benzene sulfonate.

26. The additive of claim 1 wherein said air entraining agent is a sulfosuccinate.

27. The additive of claim 1 wherein said air entraining agent is a fatty sulfonate.

* * * * *